United States Patent [19]
Yamada et al.

[11] Patent Number: 5,617,520
[45] Date of Patent: Apr. 1, 1997

[54] THREE-DIMENSIONAL PATTERN EDITING APPARATUS HAVING MOVING DISTANCE CALCULATOR AND/OR A DRAGGING PATTERN HOLDING UNIT

[75] Inventors: Yoichi Yamada; Shigeo Funaki, both of Kawasaki, Japan

[73] Assignee: Fujitsu Limited, Kawasaki, Japan

[21] Appl. No.: 204,237

[22] PCT Filed: Jul. 9, 1993

[86] PCT No.: PCT/JP93/00958

§ 371 Date: Mar. 4, 1994

§ 102(e) Date: Mar. 4, 1994

[87] PCT Pub. No.: WO94/01829

PCT Pub. Date: Jan. 20, 1994

[30] Foreign Application Priority Data

Jul. 10, 1992 [JP] Japan .................................. 4-183560

[51] Int. Cl.$^6$ .................................................. G06T 17/40
[52] U.S. Cl. ............................................. 395/119; 395/761
[58] Field of Search ........................... 395/119, 120, 395/127, 137, 138, 141, 153, 155

[56] References Cited

U.S. PATENT DOCUMENTS 5,010,502  4/1991  Diebel et al. .......................... 395/117
5,067,167  11/1991  Berger ..................................... 382/46

FOREIGN PATENT DOCUMENTS 62-288979  12/1987  Japan .
04-025974  1/1992  Japan .
04-111067  4/1992  Japan .

OTHER PUBLICATIONS

Infini–D™ 1.0, User's Manual, Specular International, Ltd., Released before Sep. 10, 1990, pp. 99–102.
Swiel 3D™ Professional 2.0, User's manual, Paracomp1990, pp. 5–8 to 5–11 and 14–1 tp.

Primary Examiner—Heather R. Herndon
Assistant Examiner—Rudolph Buchel
Attorney, Agent, or Firm—Staas & Halsey

[57] ABSTRACT

A three-dimensional pattern editing apparatus used in a CAD system edits three-dimensional patterns in accordance with a user's input operation and displays the result of edition. A pattern display unit displays a plurality of three-dimensional patterns, divided into a plurality of areas, on the display device and each having the same pattern, but having different view points. A displayed pattern moving unit moves the three-dimensional pattern which is displayed on any one divided area in accordance with a predetermined input operation; A displayed pattern linking unit moves the three-dimensional pattern displayed on another are to the converted direction in accordance with on the converted amount. The real time display of pattern movement is realized by applying only a logic operation on pixel image data stored in the frame buffer rather than using the vector description of the object.

8 Claims, 10 Drawing Sheets

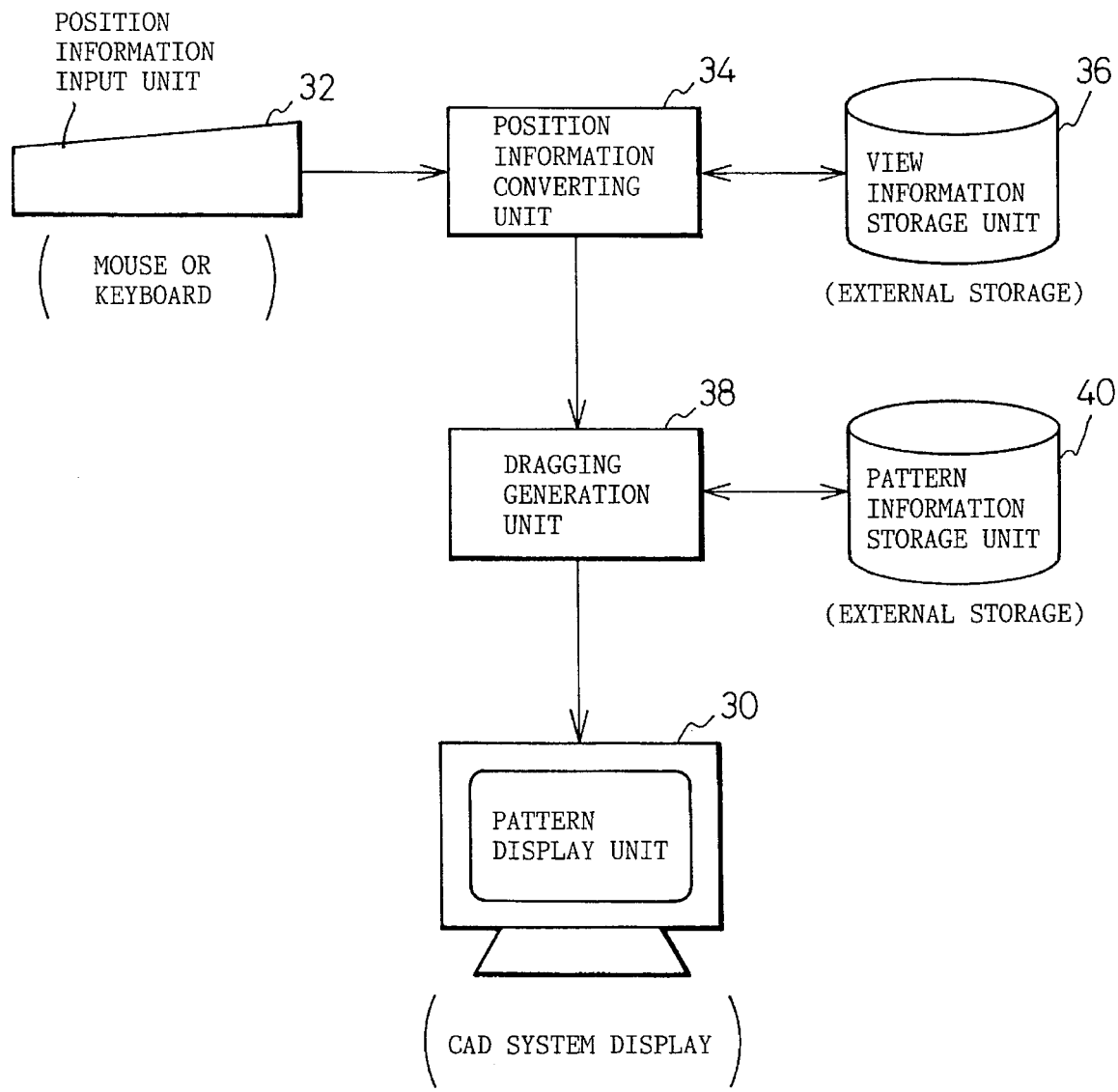

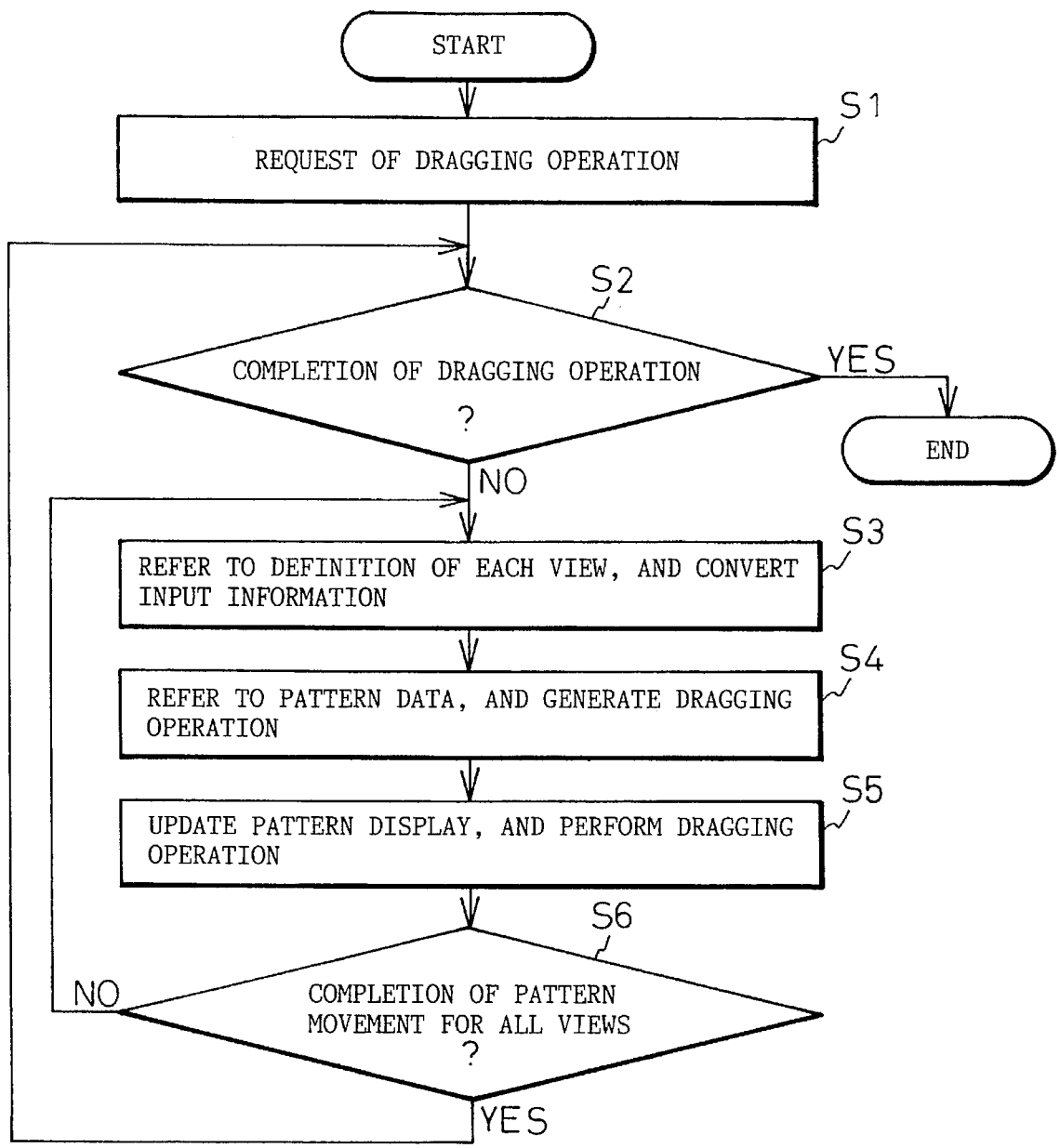

Fig. 9A

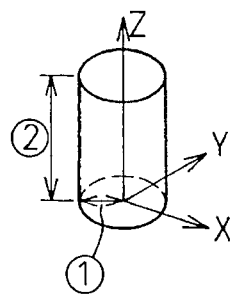

Fig. 9B

| PATTERN AREA MASK | | |
|---|---|---|
| PRIMITIVE LENGTH | | TYPE |
| | | |
| | | |
| | | |
| | | |
| RESERVED | | |
| X-COORDINATE ON 3-DIMENSIONAL SPACE TO PROVIDE AN APEX FOR DEFINED COORDINATE | | |
| Y-COORDINATE ON 3-DIMENSIONAL SPACE TO PROVIDE AN APEX FOR DEFINED COORDINATE | | |
| Z-COORDINATE ON 3-DIMENSIONAL SPACE TO PROVIDE AN APEX FOR DEFINED COORDINATE | | |
| X-COMPONENT OF UNIT DIRECTION VECTOR ON Z AXIS FOR DEFINED COORDINATE | | |
| Y-COMPONENT OF UNIT DIRECTION VECTOR ON Z AXIS FOR DEFINED COORDINATE | | |
| Z-COMPONENT OF UNIT DIRECTION VECTOR ON Z AXIS FOR DEFINED COORDINATE | | |
| X-COMPONENT OF UNIT DIRECTION VECTOR ON X AXIS FOR DEFINED COORDINATE | | |
| Y-COMPONENT OF UNIT DIRECTION VECTOR ON X AXIS FOR DEFINED COORDINATE | | |
| Z-COMPONENT OF UNIT DIRECTION VECTOR ON X AXIS FOR DEFINED COORDINATE | | |
| RADIUS OF REFERENCE CIRCLE OF COLUMN | R>0.0 ① | |
| HEIGHT OF COLUMN | HEIGHT≠0.0 ② | |

THREE-DIMENSIONAL PATTERN EDITING APPARATUS HAVING MOVING DISTANCE CALCULATOR AND/OR A DRAGGING PATTERN HOLDING UNIT

FIELD OF THE INVENTION

The present invention relates to a three-dimensional pattern editing apparatus. More particularly, it relates to a three-dimensional pattern editing apparatus which improves the efficiency of a dragging operation and raises the efficiency of editing for pattern movement when a user edits patterns by handling an input unit, such as a keyboard and a mouse, and displays the result of the editing operation on a display device.

BACKGROUND OF THE INVENTION

A three-dimensional pattern editing apparatus used in a CAD system, which utilizes a computer, is now utilized in various design fields, for example, construction, machine, electricity, electronics, automobile, etc., to perform three-dimensional design. In this apparatus, a three-dimensional pattern can be displayed on the display device from any one viewpoint which the user requires and can be enlarged and freely moved. Accordingly, this apparatus can contribute to an improvement of design quality since it can confirm the pattern visually from all angles (directions) when the user wishes to optimally arrange all structural elements in complicated structures or in three-dimensional pipe and wire arrangements.

In the above mentioned design work and confirmation process, the user frequently performs a dragging operation which moves the three-dimensional pattern by moving a cursor on the display with a keyboard or a mouse.

When performing the design work and the confirmation process by utilizing a CAD system, in general, a plurality of rectangular areas (each rectangular area is called a "view") are displayed on the display device when the user changes his viewpoint toward the three-dimensional object. Accordingly, the three-dimensional pattern for each "view" can be displayed in accordance with the various viewpoints.

Conventionally, the editing operation of the three-dimensional pattern is performed only on the pattern within any one "view". When the editing work of pattern movement is started in accordance with a dragging operation by the user, a position of destination (of movement) of the three-dimensional pattern, which is the dragged object, can be calculated in real time in response to the dragging operation. In this case, a conventional dragging operation is executed by using line patterns (vectors) so that the apparent speed of the dragging operation depends on the drawing speed of line patterns.

Further, conventionally, during dragging operations, the three-dimensional pattern is drawn for the position of the calculated line patterns only within the "view" where the mouse cursor exists, and the three-dimensional pattern which exists in the original position is deleted for every drawing operation.

When the user confirms completion of this dragging operation, the same dragging operations as above are performed to all other "views" of the three-dimensional pattern which is the object of the dragging operation. As a result, the user confirms, in all "views" and by changing his viewpoint, whether the three-dimensional pattern is moved to the target position.

However, in the above mentioned conventional method, since the pattern movement based on the dragging operation is performed only within any one "view" where the mouse cursor exists, it is difficult to check whether the three-dimensional pattern is moved to the target position during the dragging operation through another "view". Accordingly, it is necessary to perform the dragging operation repeatedly until the user can confirm completion of the movement of the three-dimensional pattern from the original position to the target position.

Further, since the target three-dimensional pattern is drawn at a position which is calculated in real time, and since the deleting process of the three-dimensional pattern which exists in the original position is repeated during the dragging operation for every drawing, there is a problem that the processing speed of the pattern movement during the dragging operation is reduced.

The object of the present invention is to solve the above problem and lies in improvement of editing efficiency of a pattern moving operation during a dragging operation.

That is, as explained above, since the conventional dragging operation is performed by using line patterns, the movement speed of the pattern depends on the drawing speed of the line pattern. Further, since the dragging operation is performed for every "view" a lot of time is required in response to an increase in the number of structural elements which are the object of the dragging operation. Still further, since the same dragging operations are repeated for every "view" a lot of time is required for the drawing operation.

In the present invention, since the three-dimensional patterns including line patterns which are the object of the drawing operation are stored in a memory as image data, and since the image data are moved (i.e., dragged) after storage, it is possible to perform high speed dragging operation only after a logic operation is executed for dots in the memory. Further, it is possible to collectively perform dragging operations for all "views".

SUMMARY OF THE INVENTION

The three-dimensional pattern editing apparatus according to a first aspect of the present invention is formed of a pattern display unit for displaying a plurality of three-dimensional patterns divided into a plurality of areas on the display device and each having the same pattern, but having different viewpoints; a displayed pattern moving unit for moving the three-dimensional pattern which is displayed on any one divided area in accordance with predetermined input operation; a pattern movement converting unit for converting an amount of movement and direction of the three-dimensional pattern in the divided area to an amount of movement and direction of the three-dimensional pattern in another divided area in real time; and a displayed pattern linking unit for moving the three-dimensional pattern displayed on another area to the converted direction in accordance with only the converted amount.

Based on above structure, in the first aspect of the present invention, when the user performs a moving operation (i.e., a dragging operation) on the three-dimensional pattern which is displayed on any one divided area, it is possible to execute in real time a pattern movement for the object in another divided area.

The three-dimensional pattern editing apparatus according to a second aspect of the present invention is formed by a pattern displaying unit for displaying the three-dimensional patterns which become the object of editing; a pattern holding unit for holding image data of the designated three-dimensional pattern in an internal memory; a moving destination calculating unit for calculating the destination of the movement of the designated three-dimensional pattern in real time in accordance with an input operation by the user; and a moved pattern displaying unit for displaying the three-dimensional pattern, which is shown by the image data on the internal memory, at the destination position calculated by the calculating unit.

Based on the above structure, it is possible to perform in real time display of the pattern movement, using the image data on the internal memory, and to realize movement in accordance with only a transfer process of the image data.

BRIEF DESCRIPTION OF THE DRAWINGS

FIG. 3 is a structural view according to an embodiment of the first embodiment of the present invention, FIG. 5 is a flowchart explaining operation in a structure shown in FIG. 3, FIGS. 9A and 9B are explanatory views for storage configuration in a pattern information storage unit shown in FIGS. 3 and 6.

DESCRIPTION OF THE PREFERRED EMBODIMENTS

Figure 1:
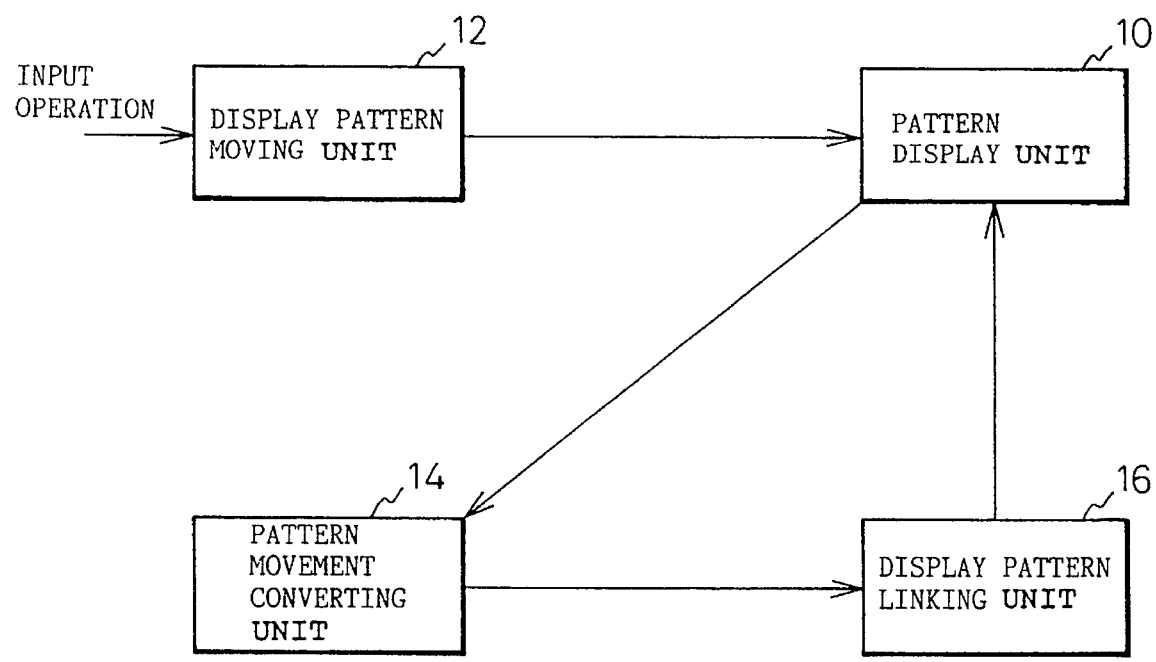
FIG. 1 is a principle view of a first embodiment of the present invention.

FIG. 1 is a principle (i.e., basic, block-diagram) view of the first embodiment of the invention. The three-dimensional pattern editing apparatus according to the first embodiment of the present invention comprises a pattern display unit 10 for displaying a plurality of three-dimensional patterns divided into a plurality of areas (views) on the display device and each having the same pattern, but having different view points; a displayed pattern moving unit 12 for moving the three-dimensional patterns which are displayed on any one view in accordance with a predetermined input operation; a pattern movement converting unit 14 for converting, in real time, an amount of distance and direction of movement of the three-dimensional pattern in the view to an amount of distance and direction of movement of the three-dimensional pattern in another view; and a displayed pattern linking means 16 for moving the three-dimensional pattern displayed on another view to the converted direction in accordance with only the converted amount.

Based on the above structure, in the first aspect of the present invention, when the user performs a moving operation (i.e., a dragging operation) on the dragging object of the three-dimensional pattern, which is displayed on any one view, it is possible to execute the pattern movement of the object in real time for another view.

Figure 2:
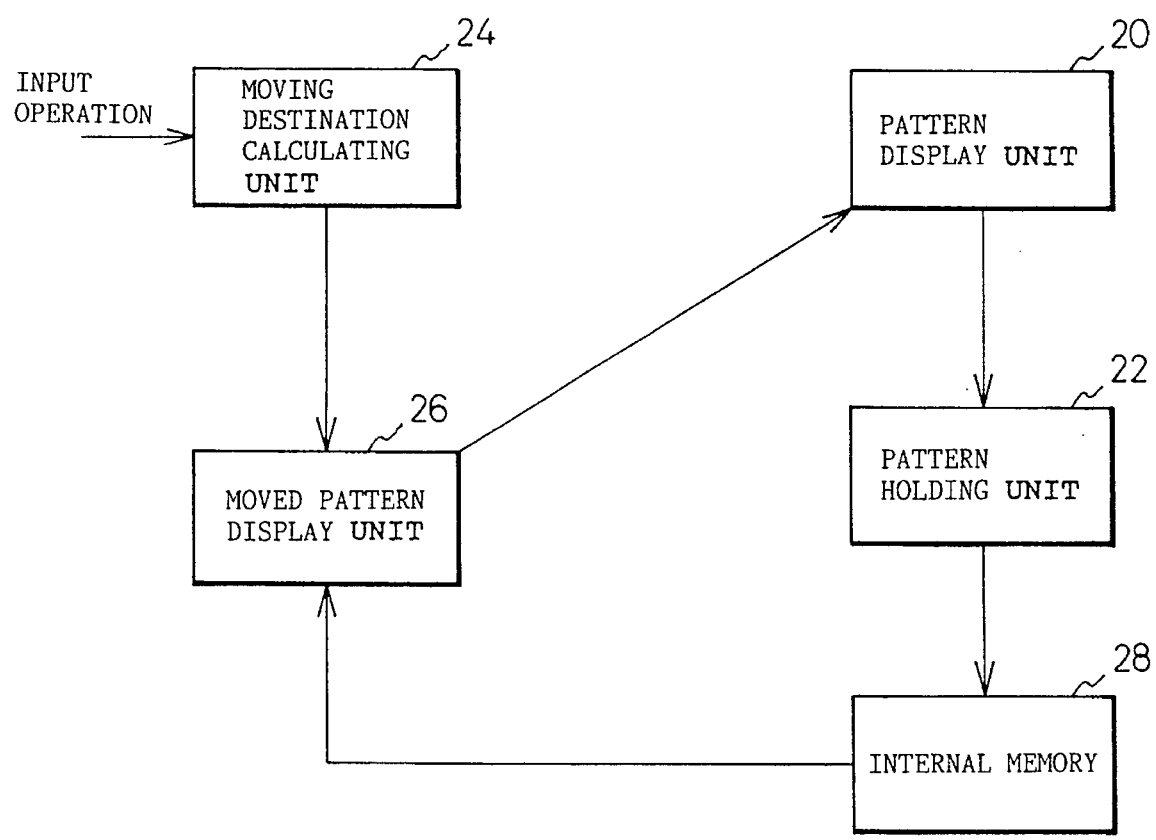
FIG. 2 is a principle view of a second invention.

FIG. 2 is a principle view of the second embodiment of the invention. The three-dimensional pattern editing apparatus according to the second embodiment of the present invention is formed by a pattern display unit 20 for displaying the three-dimensional patterns which become the object of editing; a pattern holding unit 22 for holding image data of the designated three-dimensional pattern in an internal memory 28; a moving destination calculating unit 24 for calculating the destination of movement of the designated three-dimensional pattern in real time, in accordance with an input operation by the user; and a moved pattern display unit 26 for displaying the three-dimensional pattern, which is shown by the image data in the internal memory 28, to the destination position calculated by the calculating unit.

Based on the above structure, it is possible to perform, in real time, a display of the pattern movement by using the image data in the internal memory 28 and to realize movement in accordance with only a logic operation process for the image data.

FIG. 3 is a structural view according to the first embodiment of the invention. A pattern displaying unit 30 is a display for a CAD system. As explained below (see, e.g., FIGS. 4A and 4B), the display image is divided into a plurality of views, and the same three-dimensional pattern, but having different view points, is displayed on all views.

A position information input unit 32 is, for example, a mouse or keyboard. The user pushes the mouse button, designates the object to be dragged, and initiates the start of the dragging operation. Further, as the user continues to push the mouse button, the object moves (drags) on the display device. When the user releases the mouse button, the movement stops and the dragging operation is completed. In this case, the data indicating an amount of movement and direction of dragging operation is output to a position information conversion unit 34 of the following stage.

The position information conversion unit 34 converts the amount of movement and direction of the dragging operation, which are indicated by the position information input unit 32, to move the dragged object, within each view, in real time. The conversion process refers to definition data for each view which is stored in the view information storage unit 36.

The view information storage unit 36 includes the three-dimensional conversion matrix which defines the view for every viewpoint. The position information conversion unit 34 converts the three-dimensional matrix to the coordinates on the internal memory using a known method.

The amount of pattern movement and direction for each view on the internal memory are obtained in the position conversion unit 34; these movements and directions then are sent to a dragging generation unit 38.

The dragging generation unit 38 calculates the position of destination of the pattern movement for each view in accordance with the amount of movement and the direction which are passed thereto from the position information converting unit 34, reads the data which indicates the three-dimensional pattern of the dragging object from the pattern information storage unit 40 which is an external storage apparatus, draws the three-dimensional pattern indicated by this data to the position of the destination of the movement of that pattern, which is calculated for each view, and erases the original three-dimensional pattern.

Figure 4A:
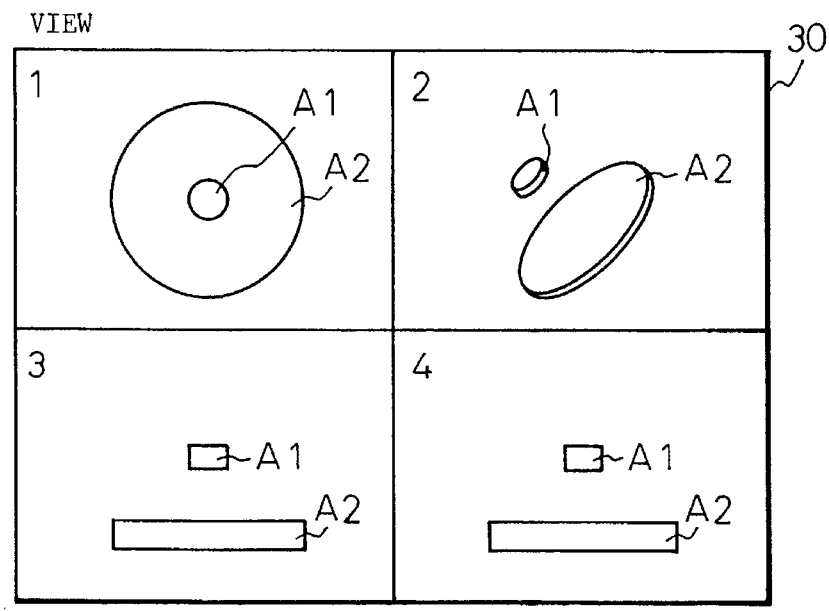
FIG. 4A is one example of display of each "view" on a display device.

FIG. 4A is one example of a display of each view on the display device. This example is an example of four divided views (views 1 to 4). As shown in the drawing, for example, when the object is structured by a small disk A1 and a large disk A2, configurations for various view points which are required by the user are displayed on views 1 to 4.

Figure 4B:
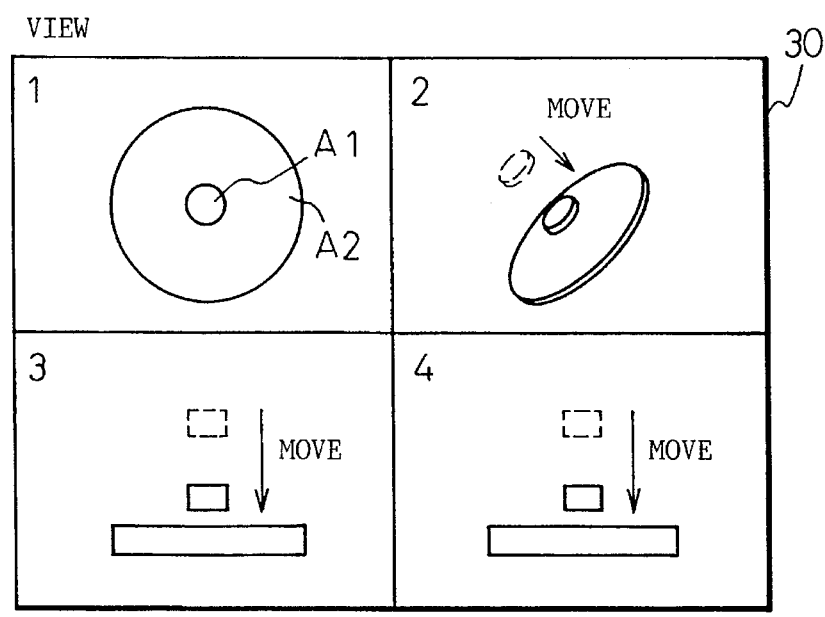
FIG. 4B is an explanatory view for movement of an object article.

FIG. 4B is an explanatory view for movement of an object. When the object of movement is A1, the amount of movement and direction are shown by an arrow. In the views 2 to 4, the small disk A1 is shown by dotted line in the original position before movement.

In the present invention, as shown by FIG. 4A, when the same three-dimensional patterns are shown in each view in accordance with different viewpoints, and when the dragging operation is performed for any one view, the pattern movement of this dragging operation is simultaneously reflected in each view as shown by FIG. 4B.

According to the present invention, the user can confirm whether or not the three-dimensional pattern is moved to the target position by referring to another view during the dragging operation. Accordingly, it is possible to move the three-dimensional pattern to the target position by one dragging operation so that the editing work for pattern movement can be easily done.

FIG. 5 is a flowchart explaining operation in the structure shown in FIG. 3. When the position information conversion unit 34 receives a start instruction (a request for dragging operation) from the user (step S1), the unit 34 checks continuously whether or not the dragging operation is completed until it receives a completion instruction (step S2). When the dragging operation is not completed (NO), the amount of movement and direction of dragging operation, which is indicated by the data sent from the position information input unit 32, are converted to changes as well the display of the object in each view, in real time, by referring to the definition data as to each of the views, which data are stored in the view information storage unit 36 (step S3). The processes S2 to S6 are repeated, until the dragging operation is completed (YES), and the process also is then completed.

In the position information converting unit 34, when the amount of pattern movement and direction of each view are determined, the amount of movement and direction are sent to the dragging generation unit 38.

The dragging generation unit 38 calculates the position of the destination of the pattern movement for each view in accordance with the amount of movement and direction which are sent from the position information converting unit 34, reads the data which indicates the three-dimensional pattern of the dragging object from the pattern information storage unit 40 (step S4), draws the three-dimensional pattern indicated by this data at the position of destination of movement, as calculated for each view, deletes the original pattern (step S5), and finally determines whether or not the pattern movement is completed for all views (step S6). Further, when the pattern movement is completed for all views (YES), the process returns to step S2. When the pattern movement is not completed, the process starts again from step S3.

Figure 6:
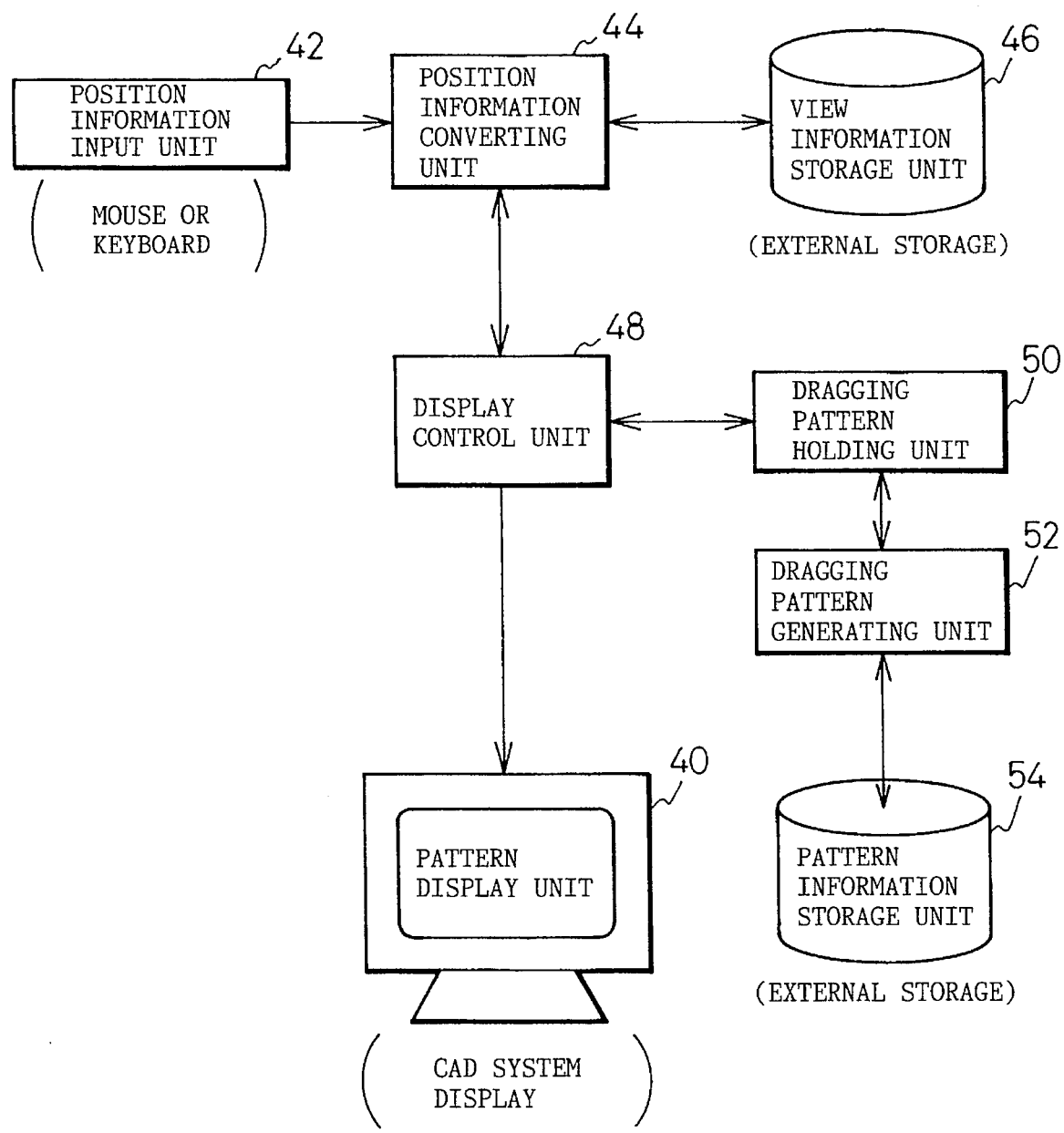
FIG. 6 is a structural view according to the second embodiment of the invention.

FIG. 6 is a structural view according to the second embodiment of the invention. As explained in relation to the embodiment of FIG. 3, the pattern displaying unit 40 is the display for a CAD system. The unit 40 divides the image into a plurality of views, and displays the same three-dimensional object in each view, based on a different viewpoint.

In the position information input unit 42, the user pushes the mouse button and designates the object which is to start the dragging operation. While the user continues to push the mouse button, the object continues to move on the display, during the operators pushing operation. Further, when the user releases the mouse button, the movement is stopped so that the dragging operation is completed. In this case, the data indicating the amount of movement and direction of the dragging operation are input to the position information converting unit 44 of the following stage.

The position information converting unit 44 converts the amount of movement and direction of dragging operation, which is indicated by the data sent from the position information input unit 42, to which the object is subjected, in each view and in real time from the start instruction of the dragging operation until the end instruction. The defined data for each view, which is stored in the view information storage unit 46, is referred to in the conversion process.

When initiating the start of the dragging operation from the position information input unit 42 to the position information converting unit 44, the display control unit 48 calculates the rectangular area in which the three-dimensional pattern of the dragging object is included. Further, the display control unit 48 initiates the holding of the three-dimensional pattern in the dragging pattern holding unit 50.

When the dragging pattern holding unit 50 is instructed so as to hold the three-dimensional pattern which is designated as the dragging object, it starts the dragging pattern generation unit 52. Further, the dragging pattern generation unit 52 accepts the display data in each rectangular area, which is calculated by the display control unit 48 from the pattern information storage unit 54, and stores these data in the internal memory of the dragging pattern holding unit 50.

After these operations and until the completion of dragging operation is indicated by the position information input unit 42 to the position information conversion unit 44, the position of the destination of the pattern movement in each view is calculated, as in the first embodiment, based on the amount of movement and the direction of the dragging operation which is obtained (i.e., determined) by the position information conversion unit 44, and displays the position of the dragged object at the new position and erases the original pattern.

Figure 7:
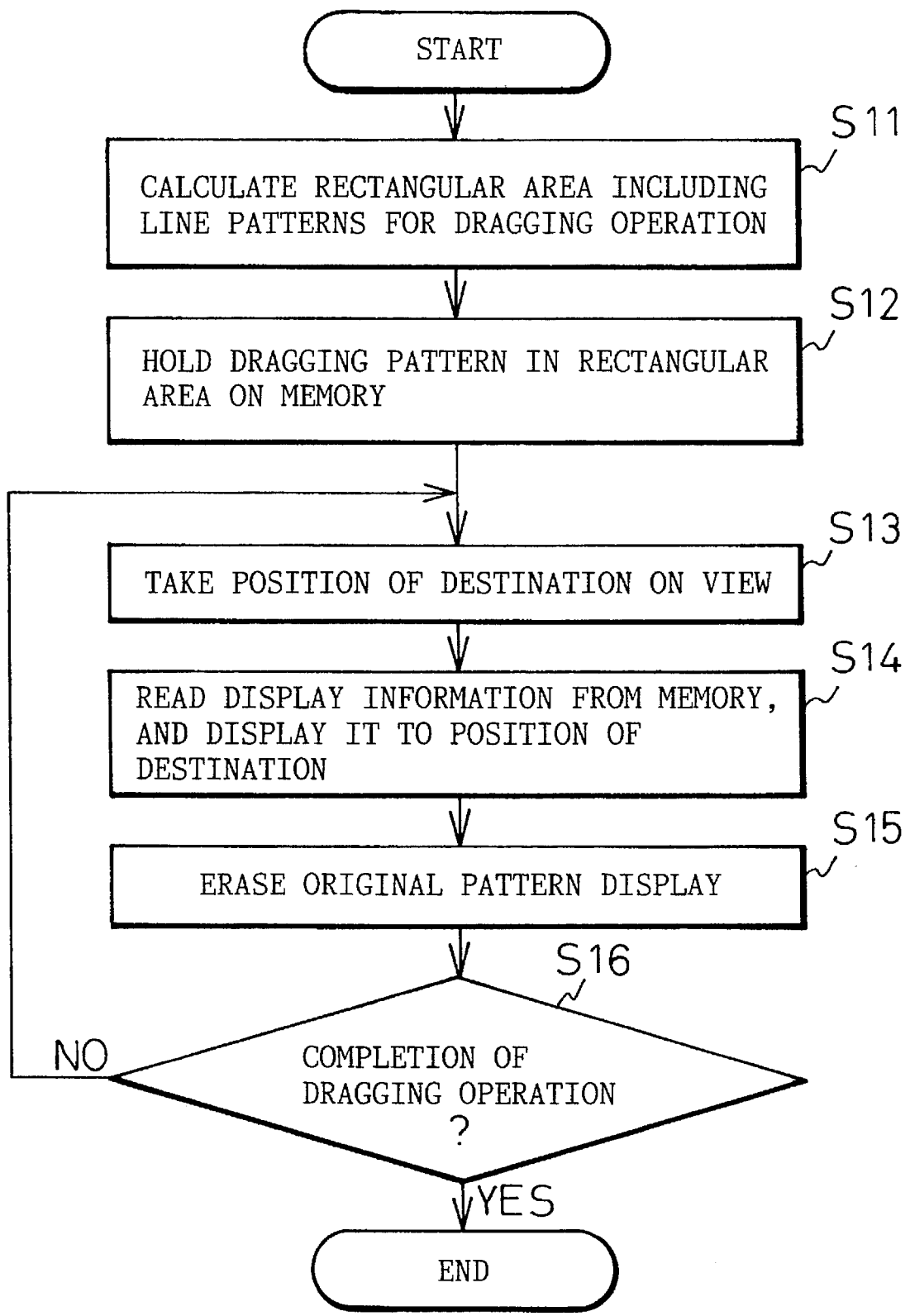
FIG. 7 is a flowchart explaining operation of the structure shown in FIG. 6.

FIG. 7 is a flowchart explaining the operation of the structure shown in FIG. 6. As explained above, when the start of the dragging operation is indicated by the position information input unit 42 to the position information converting unit 44, the display control unit 48 calculates the rectangular area which includes the three-dimensional patterns to be dragged in each view (step S11). Further, the display control unit 48 initiates the holding of the three-dimensional pattern in the dragging pattern holding unit 50, and stores the pattern to be dragged in the rectangular area in the internal memory 28 of the dragging pattern holding unit 50 (step 12).

Next, the display control unit 48 acquires the position which will become the moving destination on the view (step 13), and reads the information to be displayed from the internal memory 28 and displays it at the position of the destination (step 14). Further, the display control unit 48 erases the original pattern display (step 15), and determines whether or not the dragging operation is completed (S16). When the dragging operation is not completed (NO), the process returns to and starts from the step S13. When the dragging operation is completed (YES), the pattern movement process is completed.

Figure 8:
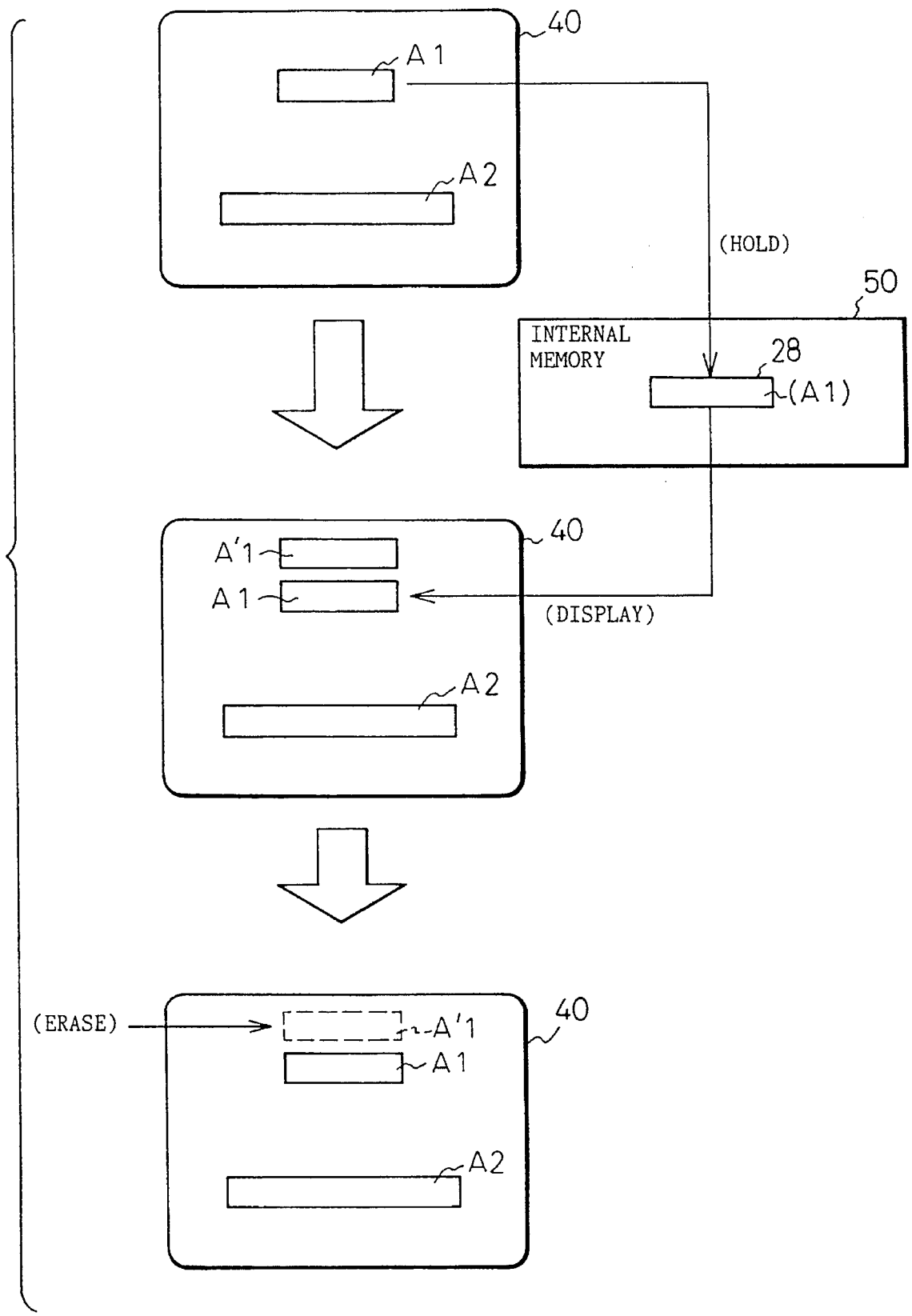
FIG. 8 is an explanatory view for explaining pattern movement and erasure processes according to the present invention.

FIG. 8 is an explanatory view for explaining pattern movement and erasure processes according to the present invention. There are a small disk A1 which is to be dragged and a large disk A2 which is not to be moved on the pattern display unit 40. First, the small disk A1 is held in the internal memory 28 of the dragging pattern holding unit 50, and displayed on the display device 40 after the position thereof is moved to another position on the internal memory of unit 50. Further, the small disk A1' at the original position is erased.

As explained above, in the present invention, the movement of the three-dimensional pattern during the dragging operation can be displayed immediately after the logic operation in the internal memory 28. Accordingly, it is possible to display the three-dimensional pattern at high speed and for every view in accordance with the dragging operation so that it is possible to effectively perform the editing work of the pattern movement.

FIGS. 9A and 9B are explanatory views of storage configuration in the pattern information storage unit 54 in FIG. 6. FIG. 9A shows one example of the three-dimensional object, for example, a column. The coordinates X, Y and Z, a radius (1) and height (2) are defined on the column.

FIG. 9B shows the data storage configuration of the three-dimensional pattern. The data storage configuration is formed of a pattern area masking portion, an attribute portion defining primitive length and type, and a geometric portion defining coordinates X, Y, Z on the three-dimensional space and vectors of unit direction for Z and X axes.

Figure 10:
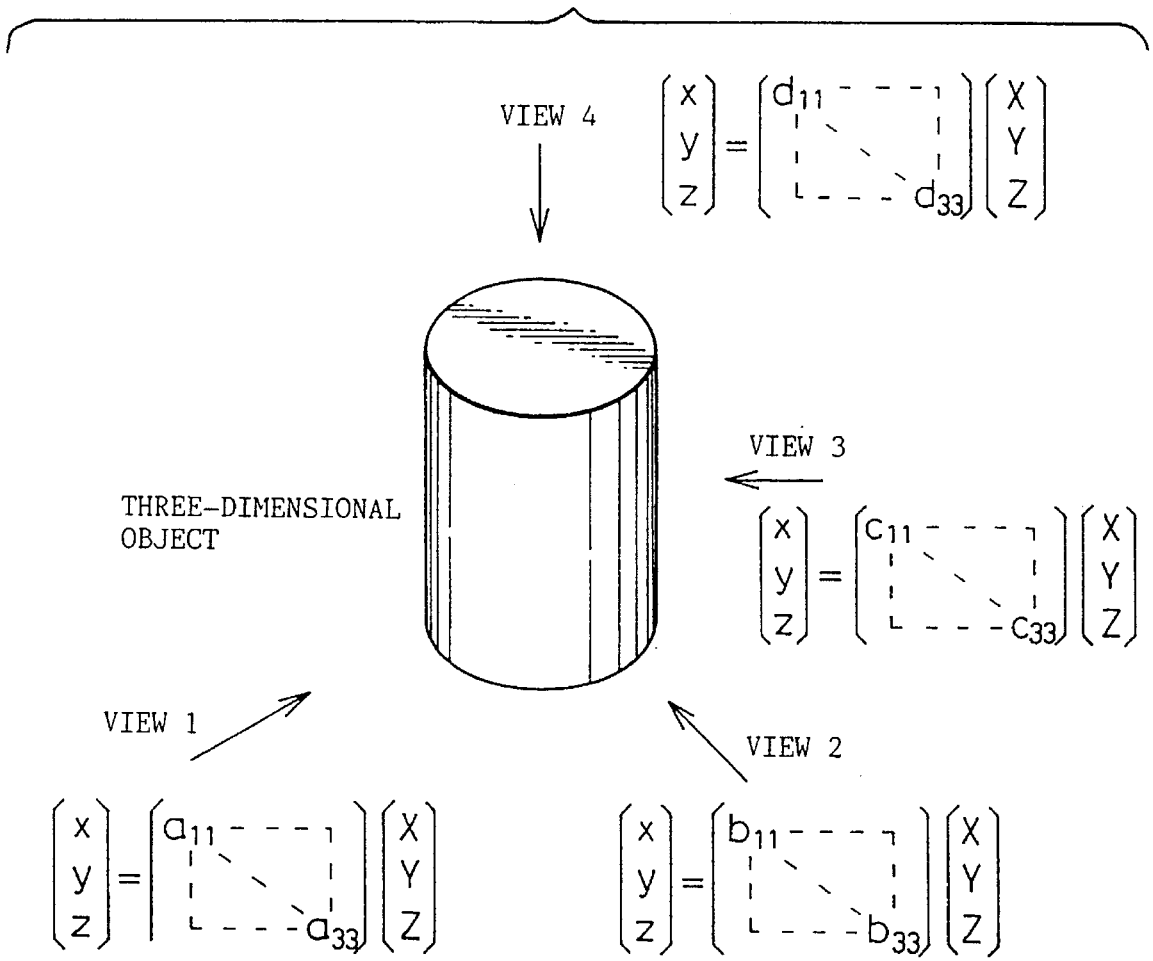
FIG. 10 is an explanatory view of the storage configuration in a view information storage unit.

FIG. 10 is an explanatory view of the storage configuration in the view information storage unit 46 of FIG. 3. There are four views 1 to 4 for the three-dimensional object shown in the drawing. These views correspond to four views in FIG. 4A. Each view is defined by the three-dimensional coordinate conversion matrix. The position information converting unit 34 of FIG. 3 converts the coordinates of each view to the coordinates in the internal memory in accordance with the three-dimensional coordinate conversion matrix of each view in the view information storage unit 36.

According to the present invention, since it is possible to easily perform the dragging operation at high speed in a three-dimensional pattern editing apparatus which is used in the CAD system, the present invention has high capability of utilization for pattern processing in a CAD system.

We claim:

1. A three-dimensional pattern editing apparatus in a CAD system, said apparatus comprising:

pattern display means for displaying a plurality of different views, of related three-dimensional patterns having respective, different viewpoints and indicating a common object, on a plurality of respective, divided display areas;

input means for permitting a user to input a request for performing a dragging operation on an object in accordance with selecting a three-dimensional pattern of the object as displayed on a selected, divided display area, and moving the selected three-dimensional pattern;

display pattern moving means for moving the selected, three-dimensional pattern displayed on the selected, divided display area in accordance with the input request;

pattern movement converting means for converting an amount and direction of movement of the selected three-dimensional pattern, as displayed in selected, divided display area, to, and for outputting, a converted amount and direction of movement of each related three-dimensional pattern of the common object for each of the other, respective different viewpoints thereof respectively displayed in the other, respective divided areas, in real time; and display linking means for moving the related three-dimensional patterns of the common object as displayed on the other, respective divided areas by the converted amount and direction of movement as output by the pattern movement converting means, the dragging operation performed by the user on the selected three-dimensional pattern displayed on the selected, divided area thereby being converted to and executed in real time as converted dragging operations for the related three-dimensional patterns in the respective, divided areas.

2. A three-dimensional pattern editing apparatus as claimed in claim 1 wherein the display pattern moving means is one of a mouse and a keyboard.

3. A three-dimensional pattern editing apparatus as claimed in claim 1, further comprising a view information storage unit for storing definition data for each view and a pattern information storage unit for storing the three-dimensional pattern data.

4. A three-dimensional pattern editing apparatus as claimed in claim 1 wherein the pattern movement converting means further comprises a view information storage unit and a position information converting unit which converts each view to coordinates in an internal memory, based on view definition information derived thereby from the view information storage unit, and calculates an amount and direction of movement of the three-dimensional pattern, constituting a dragging operation performed on the three-dimensional pattern.

5. A three-dimensional pattern editing apparatus as claimed in claim 1 wherein the display pattern linking means further comprises a dragging generation unit which refers to the three-dimensional pattern and generates dragging information based on an amount and direction of movement of the three-dimensional pattern.

6. A three-dimensional pattern editing apparatus as claimed in claim 1, further comprising:

pattern holding means for holding image data of the three-dimensional pattern of an object on which a dragging operation is performed;

moving destination calculating means for calculating the destination of movement of the three-dimensional pattern which becomes the dragged object in accordance with the input request by the user; and moved pattern display means for displaying the three-dimensional pattern, as indicated by image data in an internal memory, at a calculated destination position, the processes for displaying the dragging operation in real time being executed in accordance with only a logic operation by using image data in the internal memory.

7. A three-dimensional pattern editing apparatus as claimed in claim 6, wherein the moving destination calculating means further comprises a position information converting unit which converts each view to coordinates in an internal memory based on stored view definition information, and calculates an amount and direction of movement of the three-dimensional pattern.

8. A three-dimensional pattern editing apparatus as claimed in claim 6, wherein the moved pattern display means further comprises a display control unit for controlling the displayed image, and a dragging pattern holding unit for holding a dragging pattern in an internal memory based on an instruction from the display control unit.

* * * * *